(12) United States Patent
Moore

(10) Patent No.: US 10,344,861 B2
(45) Date of Patent: Jul. 9, 2019

(54) HAMMER HAVING COMPOSITE PISTON SLEEVE

(71) Applicant: Caterpillar Inc., Peoria, IL (US)

(72) Inventor: Cody T. Moore, Waco, TX (US)

(73) Assignee: Caterpillar Inc., Deerfield, IL (US)

( * ) Notice: Subject to any disclaimer, the term of this patent is extended or adjusted under 35 U.S.C. 154(b) by 595 days.

(21) Appl. No.: 15/067,040

(22) Filed: Mar. 10, 2016

(65) Prior Publication Data

US 2016/0312892 A1 Oct. 27, 2016

Related U.S. Application Data

(60) Provisional application No. 62/152,451, filed on Apr. 24, 2015.

(51) Int. Cl.
| | |
|---|---|
| *B25D 17/26* | (2006.01) |
| *F16J 10/04* | (2006.01) |
| *B25D 17/06* | (2006.01) |
| *B25D 9/00* | (2006.01) |
| *B25D 9/04* | (2006.01) |

(52) U.S. Cl.
CPC ............ *F16J 10/04* (2013.01); *B25D 9/00* (2013.01); *B25D 9/04* (2013.01); *B25D 17/06* (2013.01); *B25D 2217/0019* (2013.01); *B25D 2222/06* (2013.01); *B25D 2222/57* (2013.01); *B25D 2222/69* (2013.01); *B25D 2250/231* (2013.01); *B25D 2250/391* (2013.01)

(58) Field of Classification Search
CPC ... F16J 10/04; B25D 9/00; B25D 9/04; B25D 17/06; B25D 2222/06; B25D 2222/57; B25D 2222/69; B25D 2250/231; B25D 2250/391

USPC .......................................................... 173/189
See application file for complete search history.

(56) References Cited

U.S. PATENT DOCUMENTS

| | | | |
|---|---|---|---|
| 3,263,770 A | 8/1966 | Staffan | |
| 4,483,402 A * | 11/1984 | Vonhoff, Jr. ............. | B25D 9/08 173/112 |
| 4,909,490 A * | 3/1990 | de Fontenay ......... | F16F 13/107 138/30 |
| 5,370,193 A | 12/1994 | Sippus et al. | |
| 8,733,468 B2 | 5/2014 | Teipel et al. | |

(Continued)

FOREIGN PATENT DOCUMENTS

| | | |
|---|---|---|
| DE | 102012211941 | 1/2014 |
| EP | 0884139 | 12/1998 |

(Continued)

*Primary Examiner* — Andrew M Tecco
*Assistant Examiner* — Mary C Hibbert-Copeland
(74) *Attorney, Agent, or Firm* — Finnegan, Henderson, Farabow, Garrett & Dunner, LLP

(57) ABSTRACT

A sleeve is disclosed for use with a piston of a hydraulic hammer. The sleeve may have a generally cylindrical body with a top end and a bottom end, and a central bore passing axially from the top end of the generally cylindrical body to the bottom end. The generally cylindrical body may be a composite structure including a guide layer forming an inner annular surface of the central bore, an energizer layer located radially outward of the guide layer and being bonded to the guide layer, and a support layer bonded to the energizer layer. The support layer may form an outer surface of the generally cylindrical body.

16 Claims, 4 Drawing Sheets

(56) References Cited

U.S. PATENT DOCUMENTS

| | | |
|---|---|---|
| 2010/0263894 A1 | 10/2010 | Kristen et al. |
| 2014/0096735 A1 * | 4/2014 | Weinenger ............ F02F 3/003 123/193.6 |
| 2014/0262406 A1 | 9/2014 | Moore |

FOREIGN PATENT DOCUMENTS

| | | | |
|---|---|---|---|
| EP | 2062698 | 5/2009 | |
| EP | 3104021 A1 * | 12/2016 | ........... B22F 3/1055 |
| GB | 2063141 | 6/1981 | |

* cited by examiner

HAMMER HAVING COMPOSITE PISTON SLEEVE

RELATED APPLICATIONS

This application is based on and claims priority to U.S. Provisional Application No. 62/152,451 filed on Apr. 24, 2015, the contents of which are expressly incorporated herein by reference.

TECHNICAL FIELD

The present disclosure is directed to a hammer and, more particularly, to a hydraulic hammer having a composite piston sleeve.

BACKGROUND

A hydraulic hammer, often referred to as a breaker, can be attached to various machines for the purpose of milling asphalt, concrete, stone, and other construction materials. A conventional hammer includes a work tool (e.g., a chisel) having a tip that engages the material to be milled, and a reciprocating piston that is moved by pressurized fluid to repetitively hit against a base end of the work tool. The piston is reciprocatingly disposed within a sleeve, and fluidly connected to a remote accumulator by way of passages formed in the sleeve.

An exemplary piston sleeve for a hydraulic hammer is disclosed in U.S. Patent Publication No. 2014/0262406 of Moore that published on Sep. 18, 2014 ("the '406 publication"). In particular, the '406 publication discloses a hammer having a metallic piston sleeve, in which a piston reciprocates, An iron sleeve liner is placed over the sleeve, and an accumulator membrane surrounds the sleeve liner. The piston is supplied with and drained of fluid by way of passages formed between the sleeve and the sleeve liner. Specifically, longitudinally extending slots are machined into an outer annular surface of the piston sleeve and, when the sleeve liner is placed over the piston sleeve, the slots become passages for transporting high-pressure fluid to and from the piston.

While the piston sleeve of the '406 publication may perform well in many applications, it may still be less than optimal. In particular, the piston sleeve and liner together weigh a considerable amount, and this weight may limit application of the associated hydraulic hammer to smaller machines. In addition, the fabrication of the sleeve, liner, and passages may be cumbersome and expensive.

The disclosed hammer and sleeve are directed to overcoming one or more of the problems set forth above and/or other problems of the prior art.

SUMMARY

In one aspect, the present disclosure is directed to a sleeve for a piston of a hydraulic hammer. The sleeve may include a generally cylindrical body with a top end and a bottom end, and a central bore passing axially from the top end of the generally cylindrical body to the bottom end. The generally cylindrical body may be a composite structure having a guide layer forming an inner annular surface of the central bore, an energizer layer located radially outward of the guide layer and being bonded to the guide layer, and a support layer bonded to the energizer layer. The support layer may form an outer surface of the generally cylindrical body.

In another aspect, the present disclosure is directed to another sleeve for a piston of a hydraulic hammer. This sleeve may include a generally cylindrical body having a top end and a bottom end, and a central bore passing axially from the top end of the generally cylindrical body to the bottom end. The generally cylindrical body may be a composite structure having a plastic guide layer forming an inner annular surface of the central bore; a rubber energizer layer located radially outward of the plastic guide layer and being bonded to the plastic guide layer; and a plastic honeycomb support layer bonded to the rubber energizer layer, forming an outer surface of the generally, cylindrical body, and at least partially defining a plurality of longitudinal passages that extend radially through the rubber energizer layer and the plastic guide layer at ends thereof. The plastic guide layer, the rubber energizer layer, and the plastic honeycomb support layer may be fabricated as a single integral component via a 3-D printing process.

In yet another aspect, the present disclosure is directed to a hydraulic hammer. The hydraulic hammer may include a frame, a bushing disposed within a first end of the frame, a work tool reciprocatingly disposed within the bushing, and a head configured to close off a second end of the frame. The hydraulic hammer may also include a sleeve mounted within the frame and having a generally cylindrical body with a top end and a bottom end, and a central bore passing axially from the top end of the generally cylindrical body to the bottom end. The generally cylindrical body may be a composite structure including a guide layer forming an inner annular surface of the central bore; an energizer layer located radially outward of the guide layer and being bonded to the guide layer; and a support layer bonded to the energizer layer, forming an outer surface of the generally cylindrical body, and at least partially defining a plurality of longitudinal passages that extend radially through the energizer layer and the guide layer at ends thereof. The hydraulic hammer may further include a piston disposed within the generally guide layer of the cylindrical body and movable to repetitively extend from the bottom end of the central bore and engage the work tool, and a valve slidingly disposed within the sleeve and movable to regulate fluid flow through the plurality of longitudinal passages.

DETAILED DESCRIPTION

Figure 1:
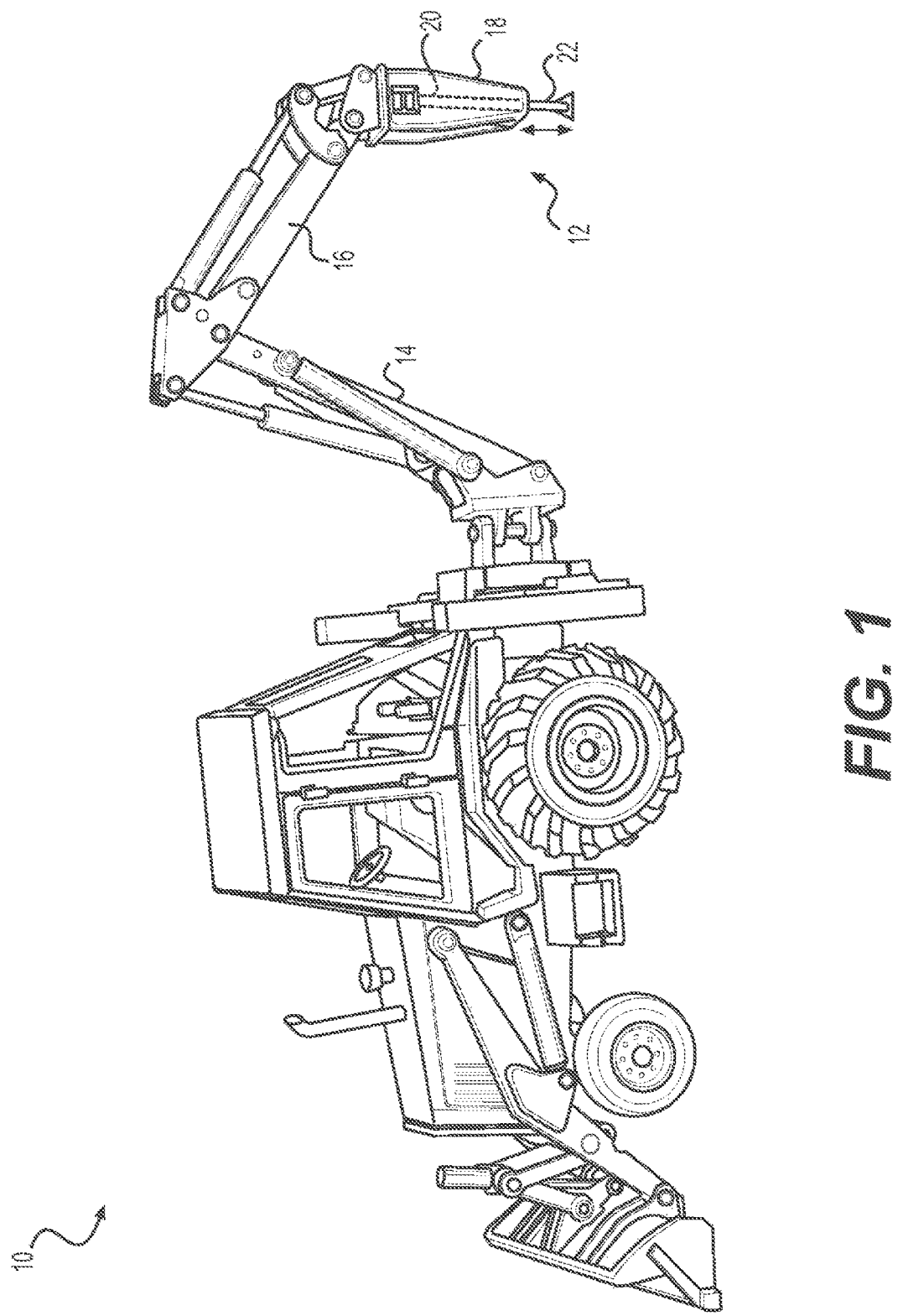
FIG. 1 is an isometric illustration of a machine equipped with an exemplary disclosed hydraulic hammer.

FIG. 1 illustrates a machine 10 having an exemplary disclosed hammer 12 connected thereto. Machine 10 may be configured to perform work associated with a particular industry, such as mining or construction. For example, machine 10 may be a backhoe loader (shown in FIG. 1), an excavator, a skid steer loader, or another machine. Hammer 12 may be pivotally connected to machine 10 through a boom 14 and a stick 16, such that hammer 12 can be lifted, moved in and out, curled, and swung left-to-right. It is contemplated that a different linkage arrangement may alternatively be utilized to move hammer 12 in another manner, if desired.

Hammer 12 may include an outer shell 18, and an actuator assembly 20 located within outer shell 18. Outer shell 18 may connect actuator assembly 20 to stick 16 and provide protection for actuator assembly 20. A work tool 22 may be operatively connected to an end of actuator assembly 20, opposite stick 16, and protrude from outer shell 18. It is contemplated that work tool 22 may have any configuration known in the art. In the disclosed embodiment, work tool 22 is a chisel bit.

Figure 2:
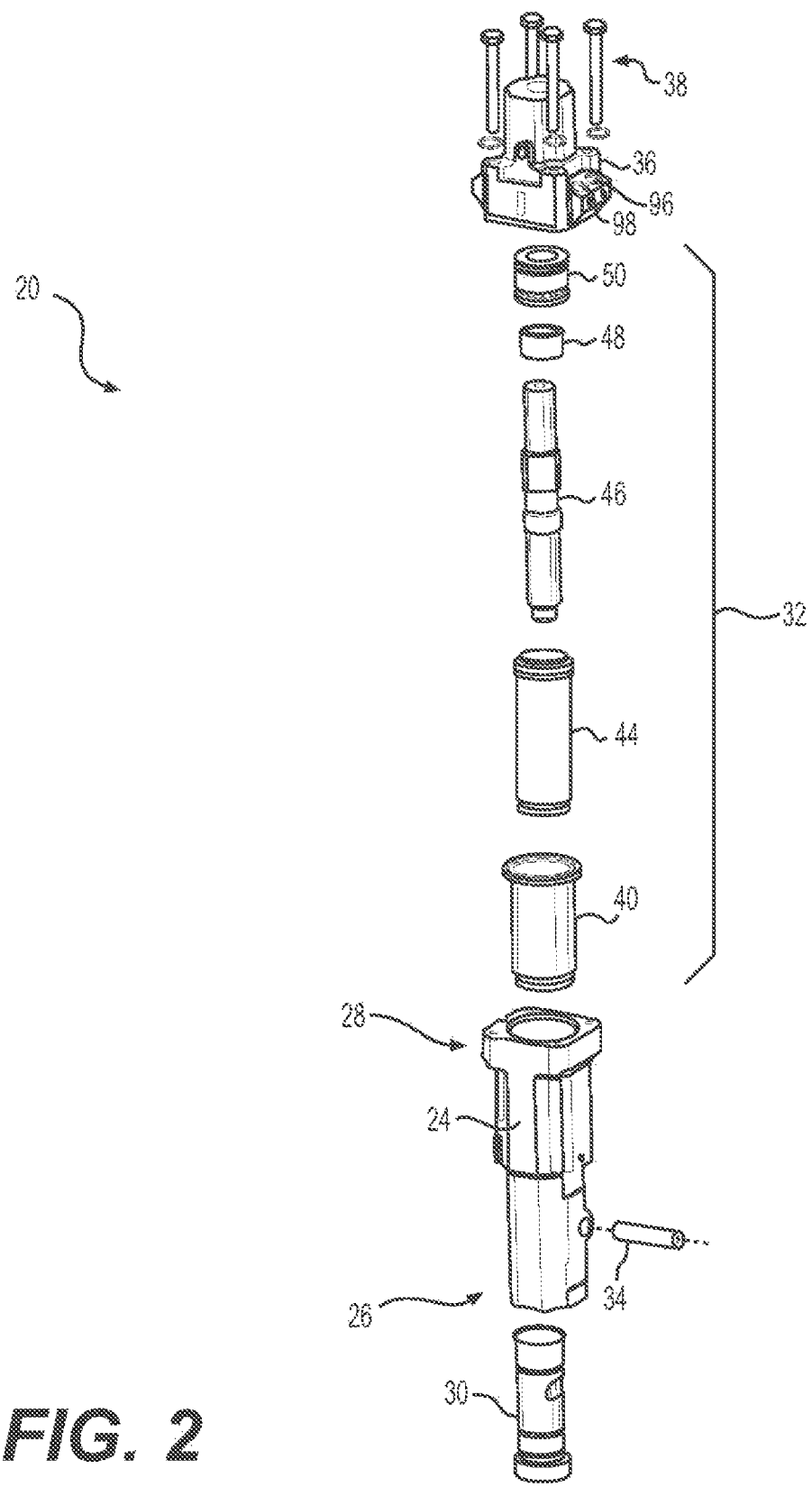
FIG. 2 is an exploded view illustration of an exemplary disclosed hammer assembly that may form a portion of the hydraulic hammer of FIG. 1.

As shown in the exploded illustration of FIG. 2, actuator assembly 20 may include a frame 24 having a bottom end 26 and an opposing top end 28. A bushing 30 may be disposed within bottom end 26, and an impact system 32 may be housed within top end 28. Bushing 30 may be configured to receive work tool 22 (referring to FIG. 1), and a pin 34 may secure work tool 22 and bushing 30 inside frame 24. A head 36 may close off top end 28 of frame 24, thereby enclosing impact system 32, and one or more threaded fasteners 38 may rigidly attach head 36 to frame 24.

Impact system 32 may be an assembly of components co-axially disposed within frame 24 that cooperate to induce vertical reciprocations of work tool 22 within bushing 30. Specifically, impact system 32 may include, among other things, an accumulator membrane 40, a sleeve 44, a piston 46, a valve 48, and a seal carrier 50. Accumulator membrane 40 may be disposed inside frame 24, sleeve 44 may be disposed inside accumulator membrane 40, and piston 46 may be disposed inside sleeve 44. Seal carrier 50 may be placed over a base end of piston 46 to form an enclosure, and valve 48 may axially slide up and down within the enclosure. Valve 48 and seal carrier 50 may be located entirely within head 36, while accumulator membrane 40 and sleeve 44 may be located entirely within frame 24. Piston 46 may be configured to slide within both of frame 24 and head 36 during operation, with an impact end of piston 46 repeatedly contacting an internal end of work tool 22 (referring to FIG. 1).

Accumulator membrane 40 may be a flexible tube configured to hold an amount of pressurized fluid sufficient to drive piston 46 through at least one stroke. The fluid may be held within an annular space formed between an inner wall of accumulator membrane 40 and an outer wall of sleeve 44. A pocket may be formed outside of accumulator membrane 40 (i.e., between an outer annular wall of accumulator membrane 40 and an inner annular wall of frame 24) and configured to receive a pressurized gas therein. The pressurized gas may be used as a spring to selectively press accumulator membrane 40 radially inward, thereby contracting the volume of accumulator membrane 40 and further pressurizing the fluid therein.

Figure 3:
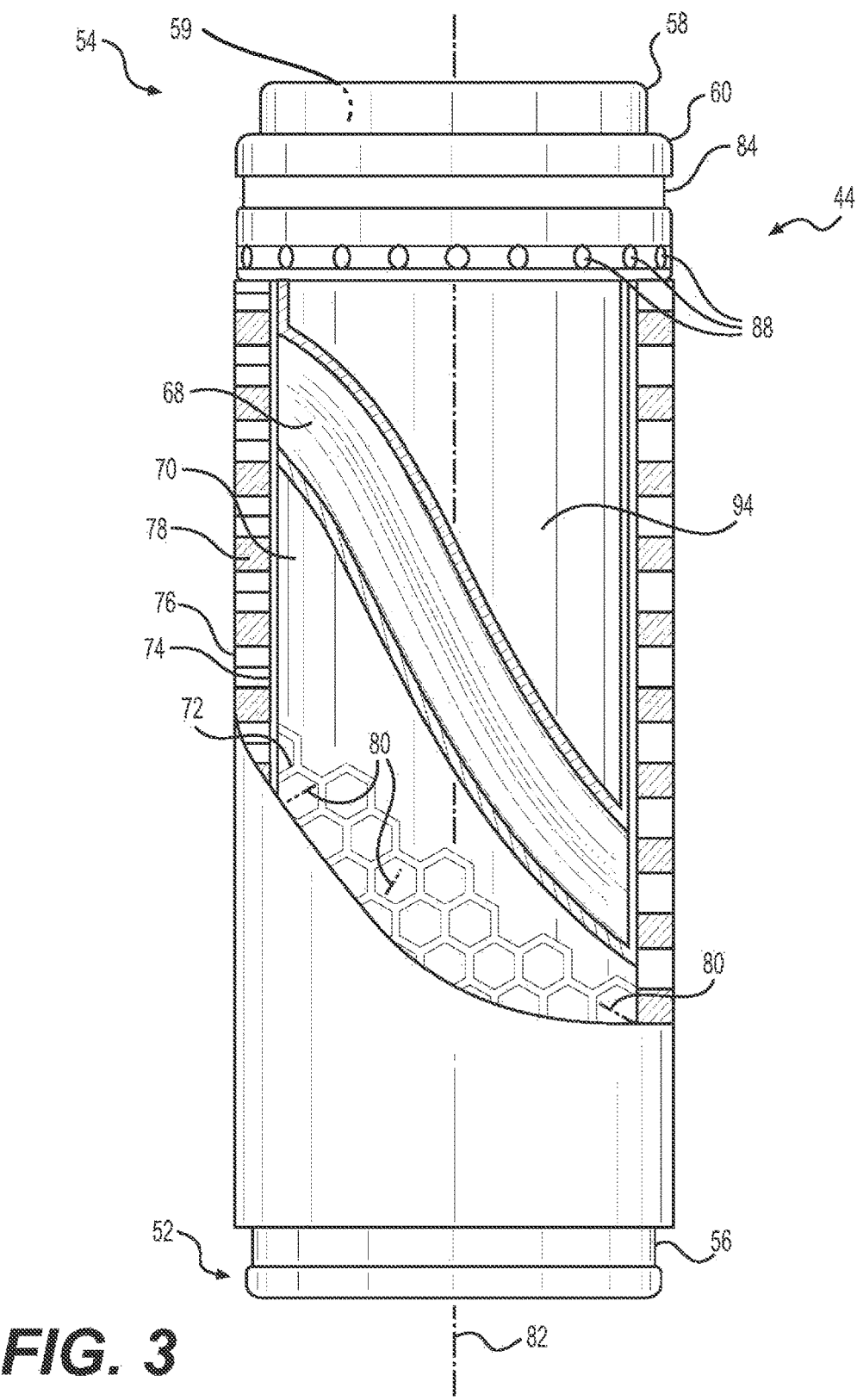
FIG. 3 is a cutaway view illustrations of an exemplary disclosed hammer sleeve that may form a portion of the hammer assembly of FIG. 2.

An exemplary sleeve 44 is shown in FIG. 3. As can be seen in this figure, sleeve 44 may be a hollow, relatively rigid tube having a bottom end 52 located near work tool 22 (referring to FIG. 1) and a top end 54 located away from work tool 22. An annular recess 56 may be formed around sleeve 44 at bottom end 52 and configured to receive an inwardly protruding lip of accumulator membrane 40, thereby creating a fluid seal between sleeve 44 and accumulator membrane 40. Top end 54 of sleeve 44 may be stepped, having a smaller diameter portion 58 protruding upward from a radially extending flange 60. Smaller diameter portion 58 may be received within seal carrier 50 (referring to FIG. 2), while flange 60 may be received within head 36. An axial valve chamber 59 may be formed inside sleeve 44 at top end 54 that extends down to an inside end of flange 66. Valve chamber 59 may be configured to slidingly receive valve 48.

Sleeve 44 may be a composite structure having a body made from multiple layers of different materials. These different layers may include, among others, a guide layer 68, an energizer layer 70, and a support layer 72. In the disclosed embodiment, each of these layers is bonded to the adjacent layer(s) along their entire axial lengths. It is contemplated, however, that these layers could alternatively be only end-bonded to each other (e.g., bonded to each other at one or both axial ends). In another alternative embodiment, each of these layers could form portions of separate components that are subsequently assembled together with or without any kind of mechanical adhesion therebetween.

Each of the different layers of sleeve 44 may have a distinct function. In particular, guide layer 68 may function as a pilot for piston 46 (referring to FIG. 2). Energizer layer 70 may function to generate a substantially uniform pressure directed inward on guide layer 68 (i.e., energizer layer 70 may compress guide layer 68). Support layer 72 may provide a desired stiffness to sleeve 44, while also functioning as structure for internal passages that will be discussed in more detail below. A material, shape, and size of each layer of sleeve 44 may be selected to provide the intended function.

Guide layer 68 may be generally cylindrical and hollow, with an interior annular surface forming a portion of a central bore 94 of sleeve 44 that receives an outer annular surface of piston 46. Central bore 94 may be open to and generally aligned with valve chamber 59. In the disclosed embodiment, guide layer 68 is flexible and designed to conform to the shape and size of piston 46, as piston 46 slides axially within guide layer 68. An inner diameter of guide layer 68 may be less than an outer diameter of piston 46, such that an interference fit is achieved. In other words, guide layer 68 may stretch outward somewhat in order to receive piston 46 and then rebound back around piston 46 to conform to an outer profile of piston 46. This fit may help to reduce fluid leakage around piston 46, as piston 46 moves up and down within guide layer 68. In the disclosed embodiment, guide layer 68 is made from a plastic material (e.g., nylon or acrylonitrile butadiene styrene). A radial thickness of guide layer 68 may be less than about ¼ of a total radial thickness of sleeve 44.

Energizer layer 70 may also be generally cylindrical and hollow, with an interior annular surface bonded to an outer annular surface of guide layer 68. In the disclosed embodiment, energizer layer 70 is also flexible (e.g., more flexible or less stiff than guide layer 68) and functions as a spring to continuously exert the inward pressure on guide layer 68 described above. This inward pressure may help to keep the inner surface of guide layer 68 in continual contact with the outer surface of piston 46, thereby reducing fluid leakage therebetween. In the disclosed embodiment, energizer layer 70 is made from a rubber material (e.g., natural rubber or urethane) having a Shore-A durometer value of about 70-95. A radial thickness of energizer layer 70 may be greater than the radial thickness of guide layer 68. For example, the radial thickness of energizer layer 70 may be about ¼-½ of the total thickness of sleeve 44.

Support layer 72 may also be generally cylindrical and hollow, with an interior annular surface bonded to an outer annular surface of energizer layer 70. In the disclosed embodiment, support layer 72 is rigid (e.g., stiffer than guide layer 68 and energizer layer 70) and functions as a structure to support the remaining layers of sleeve 44, to connect sleeve 44 to the rest of impact system 32 (referring to FIG. 3), and to provide for fluid flow throughout sleeve 44. In the disclosed embodiment, support layer 72 is made from a plastic material (e.g., nylon or acrylonitrile butadiene styrene) that is the same as or different than the plastic material of guide layer 68. A radial thickness of support layer 72 may be greater than a radial thickness of energizer layer 70.

Support layer 72 may have a porous intermediate material that helps to reduce a weight of sleeve 44, In one example, the porous construction includes a generally solid inner surface 74, a generally solid outer surface 76, and a honeycomb pattern 78 formed between inner and outer surfaces 74, 76. A longitudinal axis 80 of each cell in honeycomb pattern 78 may be oriented to pass radially inward through a central axis 82 of sleeve 44. In other words, each cell may face radially outward relative to central axis 82, such that an inner opening of each cell may have a smaller cross-sectional area than an outer-opening of the same cell. Other porous patterns (e.g., circular, oval, diamond, square, rectangular, triangular, etc.) could alternatively be used to fabricate the intermediate. material of support layer 72, if desired. In addition, the intermediate material of support layer 72 could have a random porous construction, such as a foam type of construction.

In one example, support layer 72 may have a greater length than either of guide layer 68 or energizer layer 70. In particular, support layer 72 may extend completely through top and bottom ends 54, 52 of sleeve 44, while the remaining layers may only be located within a central region of sleeve 44 where contact with piston 46 is expected to occur. For example, support layer 72 may form flange 60 and small diameter portion 58 at top end 54, and also recess 56 at bottom end 52. In this example, guide and energizer layers 68, 70 may terminate short of recess 56 and flange 60.

Figure 4:
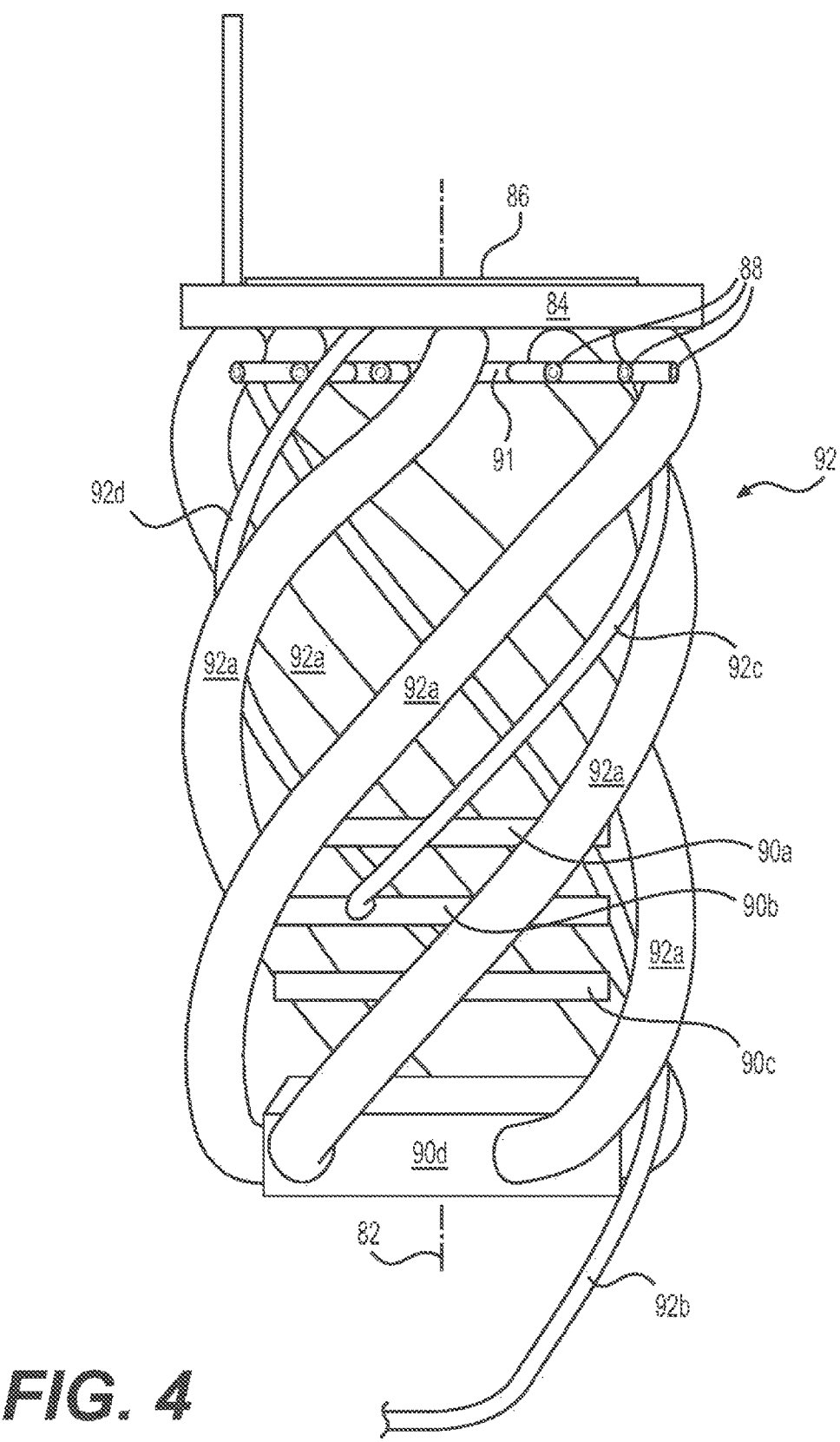
FIG. 4 is an isometric illustration of an exemplary network of fluid conduits that may be formed inside the hammer sleeve of FIG. 3.

A plurality of conduits may be formed within sleeve 44 that facilitate fluid communication between different areas of piston 46 and the different parts of impact system 32. Some of these conduits are visible in both the structural model of FIG. 3 and in the conduit model of FIG. 4, while others of these conduits are visible only in the conduit model of FIG. 4. It should be noted that the conduit model of FIG. 4 represents the primary conduits formed by the structural features of sleeve 44, with the structural features removed for clarity. It may be possible for sleeve 44 to have additional or fewer conduits that shown in the model of FIG. 4.

The primary conduits of sleeve 44 may include, among others, an outer annular recess 84 (shown in FIGS. 3 and 4), an inner annular recess 86 (shown only in FIG. 4), a plurality of radially oriented passages 88 (e.g., seventeen shown in FIGS. 3 and 4), a plurality of inner annular grooves 90 (e.g., four—shown only in FIG. 4), and a plurality of elongated passages 92 (e.g., eight—shown only in FIG. 4). Recess 84 may be formed around sleeve 44 (e.g., within outer surface 76 of support layer 72) at flange 60. Recess 86 may be formed inside of sleeve 44 (e.g., within inner walls of guide layer 68 at central bore 94) at the same general axial location as recess 84. Passages 88 may be formed in top end 54 of sleeve 44 at an axial location below recesses 84 and 86, and pass completely through sleeve 44 to valve chamber 59. In one embodiment, an additional inner annular recess 91 may be formed at an inside end of passages 88. Grooves 90 may be formed within the inner bore walls of sleeve 44 (i.e., of guide layer 68) at an axial location between recess 91 (shown only in FIG. 4) and bottom end 52 of sleeve 44. Grooves 90 may be spaced apart in the axial direction of sleeve 44 in order, starting with a groove 90a nearest top end 54 and ending with a groove 90d located nearest bottom end 52. Grooves 90a-90c may have substantially identical geometry, while groove 90d may have a larger flow area. Four general types of passages 92 may be formed within support layer 72 (i.e., encased between inner and outer surfaces 74, 76), for example, one or more (e.g., five) pressure passage 92a, a drain passage 92b, a pilot passage 92c, and a shutoff passage 92d. Passages 92b-92d may have substantially identical cross-sectional geometry, while passages 92a may have a larger flow area.

Passages 92 may interconnect the different recesses and grooves of sleeve 44. For example, pressure passages 92a may connect radial passages 88 (e.g., by way of recess 91) with groove 90d. Drain passage 92b may extend from an upper end face of sleeve 44 through groove 90a. In some embodiments, drain passage 92b may continue further toward bottom end 52 and be redirected radially inward through the walls of guide layer 68. Pilot passage 92c may connect inner annular recess 86 with groove 90b. Shutoff passage 92d may connect outer annular recess 84 with groove 90c. In some embodiments, passages 92 may spiral in generally parallel trajectories around the circumference of sleeve 44. In other embodiments, one or more passages 92 may be straight and extend generally parallel to axis 82. In yet other embodiments, one or more passages 92 may change trajectories along their length to accommodate particular sleeve features, to provide for structural integrity of sleeve 44, to enhance fabrication processes, or for any other purpose. A cross-sectional shape of passages 92 may be generally circular or oval, and may also vary along their lengths. In some embodiments, passages 92 may simply be constituted by particular cells in honeycomb pattern 74 (referring to FIG. 3) that are left incomplete and/or open to each other, such that fluid may pass between adjacent cells in a desired manner.

The various conduits of sleeve 44 may be selectively filled with or drained of pressurized oil to effect movement of piston 46 (referring to FIG. 2). Specifically, an inlet 96 and an outlet 98 (shown only in FIG. 2) may be formed within head 36 and selectively connected with the conduits of sleeve 44 based on operator command. Depending on the particular connections that are established, piston 46 may move upward, move downward, or be blocked from movement.

For example, based on a command to actuate hammer 12, pressurized fluid may be directed simultaneously through inlet 96 to the internal space of accumulator membrane 40, to recess 84, to radial passages 88 (and to recess 91), and to pressure passages 92a. The space between accumulator membrane 40 and sleeve 44 may be filled at this time with pressurized fluid for future use in quickly refilling the other conduits, when needed. The inward flow of fluid through radial passages 88 to bore 94 of sleeve 44 may be blocked at this time, with valve 48 in its normal down position.

As pressurized fluid flows downward through pressure passages 92a and is redirected radially inward to enter annular groove 90d, it may press against a lower shoulder of piston 46 and cause upward movement of piston 46. As piston 46 moves upward, annular grooves 90c, 90b, and 90a may be sequentially uncovered and fluidly connected to annular groove 90d via bore 94 of sleeve 44. When annular groove 90d is fluidly connected with annular groove 90b, pressurized fluid may flow by way of passage 92c to act on a lower end of control valve 48, causing control valve 48 to move upward and unblock recess 91 (and radial passages 88). When this happens, the pressurized fluid at radial passages 88 may flow inward to bore 94 of sleeve 44 at top end 54 and press against an upper shoulder of piston 46, urging piston 46 back downward. However, because of an imbalance of forces on and/or the upward momentum of piston 46 at this time, the downward force created by the fluid flowing through passages 88 may not yet be large enough to stop or reverse the motion of piston 46.

Further upward movement of piston 46 may eventually fluidly connect annular groove 90d with annular groove 90a. When this happens, pressurized fluid may pass from bore 94 of sleeve 44 at the lower shoulder of piston 46 up through annular groove 90a and passage 92d to outlet 98, thereby reducing a pressure of the fluid acting on the lower shoulder of piston 46. In this situation, with the pressurized fluid still acting on the upper shoulder of piston 46, the sudden drop in pressure at the lower shoulder of piston 46 may generate a force imbalance that causes downward movement of piston 46.

Piston 46 may move back downward until annular grooves 90a, 90b, and 90c are sequentially covered up and blocked from communication with annular groove 90d by piston 46. When annular groove 90b is blocked from communicating with annular groove 90d, valve 48 may be allowed (and/or forced) back down to its normal position to cut off communication of radial passages 88 with bore 94 of sleeve 44 and the upper shoulder of piston 46, thereby restarting the cycle.

If, during use of hammer 12, work tool 22 suddenly breaks ugh the material being milled, work tool 22 may move to a fully extended position. When this happens, pressurized fluid inside annular groove 90c may be communicated with the upper shoulder of piston 46, preventing an upward returning movement of work tool 22. In this situation, hammer 12 may need to be reset before further operation is possible. That is, work tool 22 may need to be mechanically pushed back into bushing 30 far enough such that annular groove 90c is again blocked by piston 46. This can be done by forcing hammer 12 against the ground material via movement of boom 14 and/or stick 16 (referring to FIG. 1).

INDUSTRIAL APPLICABILITY

The disclosed hydraulic hammer may have high efficiency and applicability. Specifically, because the disclosed hydraulic hammer may include a porous support layer within sleeve 44, a weight of sleeve 44 may be reduced. The use of plastic and rubber materials may further reduce the weight of sleeve 44. This weight reduction may result in quick movements of the associated work tool. Quick work tool movements may facilitate high productivity of the associated machine and, thereby also improve an efficiency of the milling process. Further, the reduced weight of sleeve 44 may make hammer 12 easier to move by smaller and less-powerful machines.

In the disclosed embodiment, one or more layers of sleeve 44 (including any one or more of the conduits shown in FIG. 4) may be fabricated through a 3-D printing process. For example, one or more of guide layer 68, energizer layer 70, and support layer 72 may be simultaneously printed, such that, at conclusion of the printing process, the layer(s) are integrally formed as a single component and bonded to each other. In the depicted example, all of guide layer 68, energizer lay 70, and support layer 72 (as well as all of the conduits shown in FIG. 4) are simultaneously formed via 3-D printing.

3-D printing, for the purposes of this disclosure, may be considered an additive fabrication process wherein material (e.g., plastic, rubber, etc.) is deposited in successive layers under the control of a computer. The material rimy be deposited based on data associated with a 3-D electronic model (e.g., a model of sleeve 44) and according to instructions stored on a computer-readable medium. In the disclosed example, the 3-D electronic model includes critical features (e.g., locations, orientations, dimensions, properties, tolerances, etc.) of guide layer 68, energizer layer 70, and support layer 72. In some embodiments, a cleaning, hardening, heat treatment, material removal, and/or polishing process may still need to be completed after deposition of the layers of material, in order to complete fabrication of sleeve 44.

By forming sleeve 44 via a 3-D printing process, the formation may be faster and less expensive than first forming separate components, drilling passages into the components, and then joining the components to each other. In addition, 3-D printing may allow for complex passage trajectory, reduced passage length, smooth continuous passage trajectories, and fewer components (e.g., passage plugs, restrictive orifices, etc.), that improve performance and further reduce costs. In addition, sleeve 44 may be able to have thinner and/or lighter-weight walls (e.g., due to the porosity of support layer 72), resulting in an even lighter weight component that has greater industrial applicability.

It will be apparent to those skilled in the art that various modifications and variations can be made to the piston sleeve and hammer of the present disclosure. Other embodiments of the hammer will be apparent to those skilled in the art from consideration of the specification and practice of the piston sleeve and hammer disclosed herein. It is intended that the specification and examples be considered as exemplary only, with a true scope of the disclosure being indicated by the following claims and their equivalents.

What is claimed is:

1. A sleeve for a piston of a hydraulic hammer, the sleeve comprising:
   a generally cylindrical body having a top end and a bottom end; and
   a central bore passing axially from the top end of the generally cylindrical body to the bottom end;
   wherein the generally cylindrical body is a composite structure including:
      a guide layer forming an inner annular surface of the central bore;
      an energizer layer located radially outward of the guide layer and being bonded to the guide layer; and
      a support layer bonded to the energizer layer and forming an outer surface of the generally cylindrical body;
   wherein the guide layer and the support layer are fabricated from a plastic material; and the energizer layer is fabricated from a rubber material; and
   wherein the support layer includes:
      a generally solid inner surface bonded to an outer surface of the energizer layer;
      a generally solid outer surface; and
      a porous intermediate material located between the generally solid inner and outer surfaces.

2. The sleeve of claim 1, wherein the energizer layer surrounds and compresses the guide layer inward.

3. The sleeve of claim 1, further including a valve chamber formed in the top end of the sleeve, wherein:
   the guide and energizer layers terminate at an inner axial end of the valve chamber; and
   the support layer extends past the inner axial end of the valve chamber and forms an annular wall of the valve chamber.

4. The sleeve of claim 1, wherein:
a thickness of the support layer is greater than a thickness of the energizer layer;
a thickness of the energizer layer is greater than a thickness of the guide layer;
the thickness of the guide layer is less than one-fourth of a total thickness of the sleeve; and
the thickness of the energizer layer is ¼-½ of the total thickness of the sleeve.

5. The sleeve of claim 1, wherein:
the guide layer is stiffer than the energizer layer; and
the support layer is stiffer than the guide layer.

6. The sleeve of claim 1, wherein the guide layer, the energizer layer, and the support layer are fabricated as a single integral component via a 3-D printing process.

7. The sleeve of claim 1, wherein:
the porous intermediate material has a honeycomb pattern; and
each cell of the honeycomb pattern has a longitudinal axis extending radially inward to a center axis of the sleeve.

8. The sleeve of claim 1, wherein the support layer least partially defines a plurality of longitudinal passages that extend radially through the energizer layer and the guide layer at ends thereof.

9. The sleeve of claim 8, wherein:
the top end of the generally cylindrical body has a smaller diameter than the bottom end; and
the outer surface of the generally cylindrical body formed by the support layer includes:
a radially-extending flange located adjacent the top end; and
a first annular recess located at the bottom end.

10. The sleeve of claim 9, wherein the sleeve further includes a plurality of radial passages extending inward through the radially-extending flange of the generally cylindrical body.

11. The sleeve of claim 10 wherein:
the plurality of longitudinal passages includes:
a plurality of pressure passages fluidly connected at upper ends with the plurality of radial passages;
a drain passage;
a pilot passage; and
a shutoff passage; and
the sleeve further includes:
a first annular groove formed within the inner annular surface of the central bore and fluidly connected to lower ends of the plurality of pressure passages;
a second annular groove formed within the inner annular surface of the central bore and fluidly connected to a lower end of the drain passage;
a third annular groove formed within the inner annular surface of the central bore and fluidly connected to a lower end of the pilot passage; and
a fourth annular groove formed within the inner annular surface of the central bore and fluidly connected to a lower end of the shutoff passage.

12. The sleeve of claim 11, wherein:
the first annular groove is located closer to the bottom end of the generally cylindrical body than the fourth annular groove;
the fourth annular groove is located closer to the bottom end of the generally cylindrical body than the third annular groove; and
the third annular groove is located closer to the bottom end of the generally cylindrical body than the second annular groove.

13. The sleeve of claim 12, wherein:
the outer surface of the generally cylindrical body formed by the support layer further includes a second annular recess located in the radially-extending flange; and
a lower end of the shutoff passage is in fluid communication with the second annular recess.

14. The sleeve of claim 1, wherein the plurality of longitudinal passages are smooth and continuous along their lengths, and curve inward to extend radially through the energizer layer and the guide layer at the ends thereof.

15. A sleeve for a piston of a hydraulic hammer, the sleeve comprising:
a generally cylindrical body having a top end and a bottom end; and
a central bore passing axially from the top end of the generally cylindrical body to the bottom end,
wherein the generally cylindrical body is a composite structure including:
a plastic guide layer forming an inner annular surface of the central bore;
a rubber energizer layer located radially outward of the plastic guide layer and being bonded to the plastic guide layer; and
a plastic honeycomb support layer bonded to the rubber energizer layer, forming an outer surface of the generally cylindrical body, and at least partially defining a plurality of longitudinal passages that extend radially through the rubber energizer layer and the plastic guide layer at ends thereof,
wherein the plastic guide layer, the rubber energizer layer, and the plastic honeycomb support layer are fabricated as a single integral component via a 3-D printing process.

16. A hydraulic hammer, comprising:
a frame;
a bushing disposed within a first end of the frame;
a work tool reciprocatingly disposed within the bushing;
a head configured to close off a second end of the frame;
a sleeve mounted within the frame and having:
a generally cylindrical body having a top end and a bottom end; and
a central bore passing axially from the top end of the generally cylindrical body to the bottom end,
wherein the generally cylindrical body is a composite structure including:
a guide layer forming an inner annular surface of the central bore;
an energizer layer located radially outward of the guide layer and being bonded to the guide layer;
the energizer layer surrounds and compresses the guide layer inward; and
a support layer bonded to the energizer layer, forming an outer surface of the generally cylindrical body, and at least partially defining a plurality of longitudinal passages that extend radially through the energizer layer and the guide layer at ends thereof;
a valve chamber formed within the top end of the sleeve, wherein:
the guide and energizer layers terminate at an inner axial end of the valve chamber;
the support layer extends past the inner axial end of the valve chamber and forms an annular wall of the valve chamber;
the guide layer is stiffer than the energizer layer;
the support layer is stiffer than the guide layer;
the guide layer and the support layer are fabricated from a plastic material; and the energizer layer is fabricated from a rubber material;

wherein the support layer includes:

a generally solid inner surface bonded to an outer surface of the energizer layer;

a generally solid outer surface; and a porous intermediate material having a honeycomb pattern and being located between the generally solid inner and outer surfaces;

a piston disposed within the guide layer of the generally cylindrical body and movable to repetitively extend from the bottom end of the central bore and engage the work tool; and a valve slidingly disposed within the sleeve and movable to regulate fluid flow through the plurality of longitudinal passages.

* * * * *